United States Patent
Gfeller et al.

(10) Patent No.: US 6,424,442 B1
(45) Date of Patent: *Jul. 23, 2002

(54) OPTICAL TRANSMITTER AND TRANSCEIVER MODULE FOR WIRELESS DATA TRANSMISSION

(75) Inventors: Fritz Gfeller, Rueschlikon; Heinz Richard, Adliswil; Beat Weiss, Edlibach, all of (CH)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/793,994
(22) PCT Filed: Sep. 3, 1994
(86) PCT No.: PCT/EP94/02940
§ 371 (c)(1),
(2), (4) Date: Feb. 25, 1997
(87) PCT Pub. No.: WO96/08090
PCT Pub. Date: Mar. 14, 1996

(51) Int. Cl.[7] .................. H04B 10/00; H04B 10/04; F21V 13/00
(52) U.S. Cl. .............. 359/152; 359/152; 359/154; 359/159; 359/142; 359/180; 362/245; 362/242; 362/243
(58) Field of Search .............. 359/142, 152, 359/159, 163, 180; 362/240, 242, 243, 246, 252, 282, 800

(56) References Cited

U.S. PATENT DOCUMENTS 5,561,346 A * 10/1996 Byrne ................... 313/512
5,757,528 A   5/1998 Bradley et al. ........... 359/152
5,774,247 A   6/1998 Taglione et al. ......... 359/152
5,782,553 A * 7/1998 McDermott ............. 362/245
5,808,769 A   9/1998 Kerklaan et al. ......... 359/180

FOREIGN PATENT DOCUMENTS

| | | |
|---|---|---|
| GB | 94/02873 | 2/1994 |
| JP | 59-180582 | 10/1984 |
| JP | 63-88639 | 6/1987 |
| JP | 63-40048 | 3/1988 |
| JP | 63-64142 | 4/1988 |
| JP | 63-120437 | 8/1988 |
| JP | 2-54107 | 4/1990 |
| JP | 5-25753 | 4/1993 |
| JP | 5-82149 | 11/1993 |
| JP | 6-169288 | 6/1994 |

* cited by examiner

Primary Examiner—Jason Chan
Assistant Examiner—M. R. Sedighian
(74) Attorney, Agent, or Firm—Scott W. Reid

(57) ABSTRACT

Disclosed are optical transmitter and transceiver modules for data communication. Such a transceiver module comprises an array of light emitting diodes mounted on a mounting base (140) being arranged in a regular and symmetrical manner in a dome-shaped housing (142). This housing (142) comprises diffusor means for source enlargement. In addition to the transmitter part consisting of said diodes, the transceiver module comprises a receiver. The receiver has four photodiodes (143) arranged below the mounting base (140). These photodiodes are tilted and face in different directions to receive light from all around the module. The photodiodes are protected by a thin wire mesh (145) which serves as Faraday cage to reduce electro magnetic interference. A substrate (144) for electronic circuitry in SMD-Technology is situated underneath the photodiodes (143).

28 Claims, 13 Drawing Sheets

OMNIDIRECTIONAL

Reduced Range

High Ambient Light

DIRECTIONAL

Maximum Range in one Direction

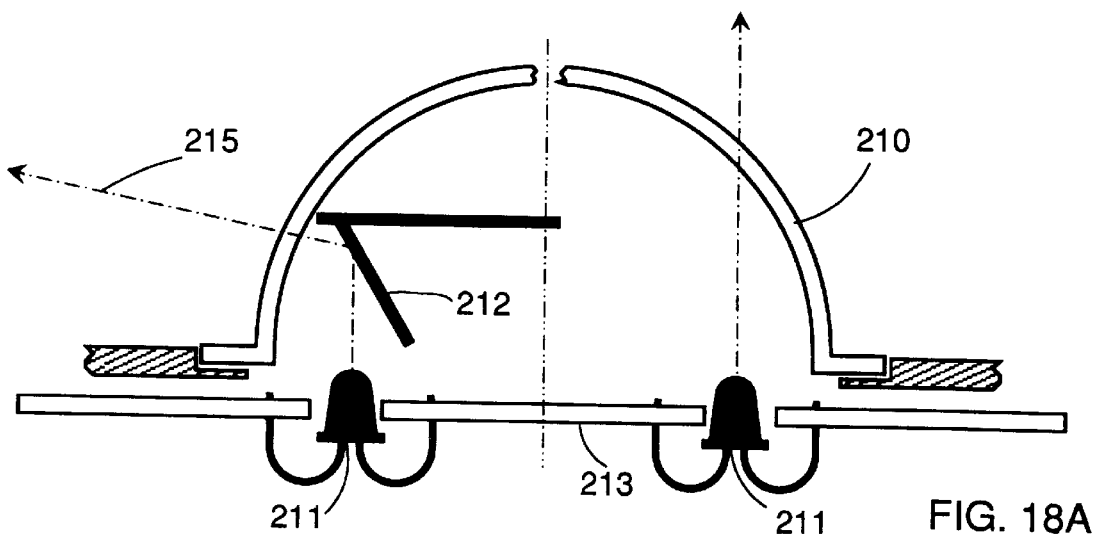
FIG. 18A
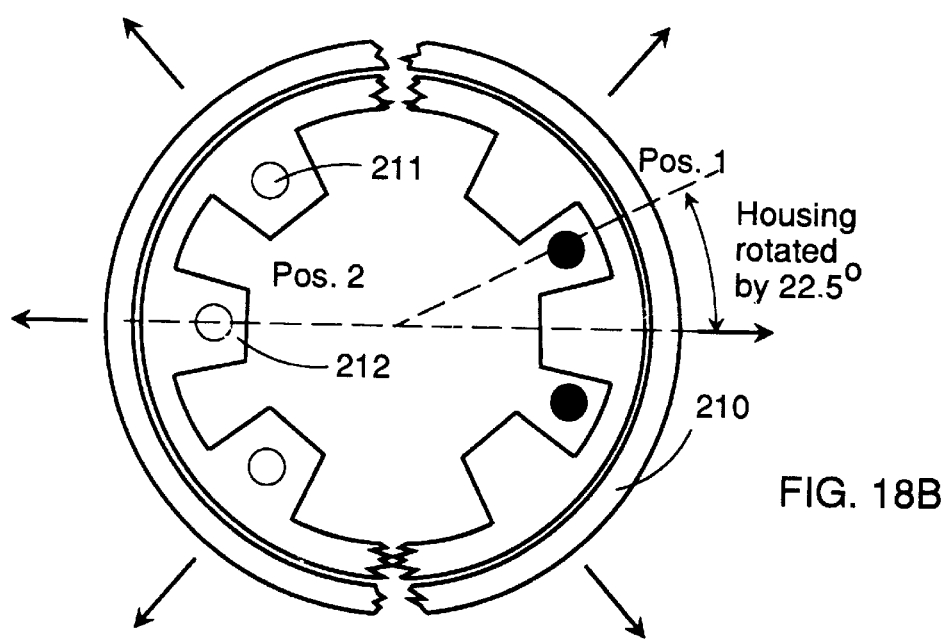
FIG. 18B
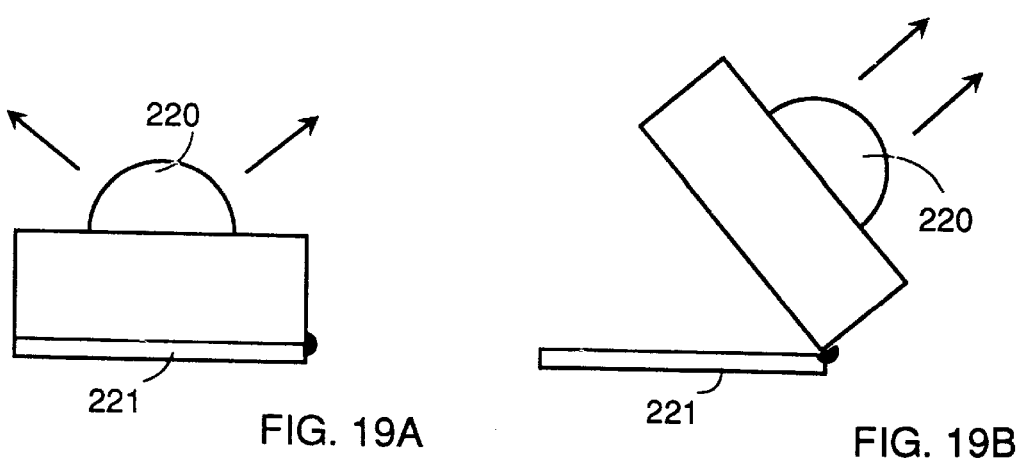
FIG. 19A
FIG. 19B

OPTICAL TRANSMITTER AND TRANSCEIVER MODULE FOR WIRELESS DATA TRANSMISSION

TECHNICAL FIELD

The present invention concerns transmitter and transceiver modules for the optical data transmission. These modules are in particular suited for the use in infra-red data transmission systems.

BACKGROUND OF THE INVENTION

With the rapidly increasing number of workstations and personal computers (e.g. desktop or handheld ones) in all areas of business, administration, and fabrication, there is also an increasing demand for flexible and simple interconnection of these systems. There is a similar need as far as the hook-up and interconnection of peripheral devices, such as keyboards, computer mice, printers, plotters, scanners, displays etc., is concerned. The use of electrical wire networks and cables becomes a problem in particular with increasing density of systems and peripheral devices and in the many cases where the location of systems, or the configuration of subsystems, must be changed frequently. It is therefore desirable to use Wireless communication systems for interconnecting such devices and systems to eliminate the requirement of electrical cable networks.

In particular the use of optical signals for exchanging information between systems and remote devices received increased interest during recent years. The advantage of such wireless optical communications systems is the elimination of most of the conventional wiring. With respect to radio frequency (RF) wireless transmission, optical infrared (IR) wireless transmission has the advantages that no communication regulations apply and no PTT or FCC license is required. Additionally, no disturbance by electromagnetic interference and no interference from other RF channels can occur, and the radiation is confined to a room so that better data security is guaranteed than with RF systems. There is thus no interference with similar systems operating next door and a higher degree of data security is afforded than radio-frequency transmission can offer. In contrast to radio-frequency antenna, the dimensions of light emitting diodes (LED) and photodiodes are usually smaller, which is of particular interest when designing portable computers.

The optical signals in such systems might directly propagate to the optical receiver of the receiving system or they might indirectly reach the receivers after changes of the direction of propagation due to processes like reflections or scattering at surfaces. Today, the former case is realized in docking stations for portable computers where the data transfer takes place between an optical transmitter and a receiver which are properly aligned and close together at a distance on the scale of cm. The latter case is typical for applications in an office environment in which undisturbed direct transmission of optical signals between transmitters and receivers several meters away from each other is impractical or even impossible due to unavoidable perturbations of the direct path. One known approach to achieve a high degree of flexibility is to radiate optical signals from the transmitting system to the ceiling of an office where they are reflected or diffusely scattered. Thus, the radiation is distributed over a certain zone in the surroundings of the transmitter The distribution of the light signals spreading from the ceiling depends on many details which are characteristic for the particular environment under consideration. However, essential in this context is mainly that the transmission range, i.e. the distance between transmitting system and receiving system, is limited to some final value, hereafter called the transmission range, since the energy flux of the transmitted radiation decreases with increasing distance of propagation and the receiver sensitivity is limited due to a final signal-to-noise ratio. Typical known systems, operating at levels of optical power which are limited by the performance of the light sources and safety requirements for light exposure, have demonstrated transmission ranges of several meters for data rates of 1 Mbps.

Crucial parameters of a wireless optical communication system are the achievable data rate and the distance between the systems exchanging data. In an office environment, it can be necessary to communicate data over distances exceeding the transmission range of a conventional optical transmitter.

There are several disadvantages of todays wireless optical data transmission systems. First, the transmission range is not suited for use in environments such as for example large office rooms and conference rooms and the radiation characteristic and range is usually not uniform, thus requiring precise alignment of transmitter and receiver, In addition, one has to take into account that in most environments there is unavoidable ambient light, such as daylight or light from lamps, which always reaches the optical detectors, unless the system is restricted for the use in a completely dark environment. Unavoidable ambient light can lead to time-dependent signals, for example AC signals from lamps, and is an important, in many practical cases the dominant source of noise in the optical receiver. Thus, ambient light influences the signal-to-noise ratio of the receiver and, therefore, affects the transmission range. The appearance of unavoidable light is mostly statistical and often difficult to control and its intensity can drastically change, as it is apparent for sunlight or lamps being switched on and off. A further realistic effect which statistically affects the signal-to-noise ratio and thus the transmission range is the occurrence of optical path obstructions influencing the receiver signal.

A first approach to get round these problems would be to increase the output power of the transmitter module. This has proven to be impractical for several reasons. The power consumption of such transmitter modules would be way to high for use in portable systems such as for example in notebook computers or palmtop computers. However, the most important issue facing the development of optical wireless systems is optical safety. It is anticipated that optical radiation can present a hazard to the eye and to the skin if the exposure is high enough. The degree of hazard depends on a number of factors, including the exposure level (energy or power), exposure time and wavelength.

In the article "Optical Wireless: New Enabling Transmitter Technologies", P. P Smyth et al., IEEE International Conference on Communications 93, May 23–26, 1993, Geneva, Switzerland, Technical Program, Conference Record, Volume ⅓, pp. 562–566, changes to existing eye safety standards as well as a new form of transmitter technology are discussed. This new form of transmitter technology is based on the idea to enlarge the area of the optical source in order to reduce the danger of retinal damage. In this article it is proposed to use a computer generated phase hologram for example, to obtain multiple beams for beam shaping out of a single laser diode source.

This approach is a first step in the right direction, but the problem of insufficient transmission range and sufficient eye-safety has not yet been addressed and solved.

SUMMARY OF THE INVENTION

It is an object of the present invention to provide for an improved optical transmitter module.

It is a further object of the present invention to provide for an optical transmitter module of small size and with optimum radiation pattern.

It is another object of the present invention to provide for an optical transmitter module which satisfies safety standards (IEC 825-1).

It is another object of the present invention to provide for an optical transmitter module with switchable radiation pattern.

The above objects have been accomplished by provision of optical transmitter modules as hereinafter claimed.

DESCRIPTION OF THE DRAWINGS AND NOTATIONS USED

The invention is described in detail below with reference to the following drawings:

FIG. 18A shows a schematic cross-section of an optical transmitter module with switchable radiation pattern in accordance with the present invention.

FIG. 18B is a schematic top-view of the housing and reflector ring of the optical transceiver module illustrated in FIG. 18A.

FIG. 19A shows a schematic view of a fixture for mounting an optical transmitter/transceiver module with switchable radiation pattern in accordance with the present invention.

FIG. 19B is a schematic view of the fixture of FIG. 19A in a tilted position.

GENERAL DESCRIPTION

In view of the above it is highly desirable for wireless optical transmitter modules to meet the following criteria.

1. eye safety to the highest possible degree;
2. optimum source radiation pattern distributing the power-limited optical signal in an efficient way to gain maximum transmission distance at minimum dynamic range. This is of particular interest if an optical transmitter module is used in common office environments (low ceiling, diffuse propagation mode).
3. no need for aligning transmitters and receivers;
4. for environments with a very high ceiling with poor (or non-existing) reflection properties (buildings with atrium, large lecture theatres, outdoors) the possibility to rely on line-of-sight (LOS) propagation without need for aligning the transceiver modules.

Figure 1:
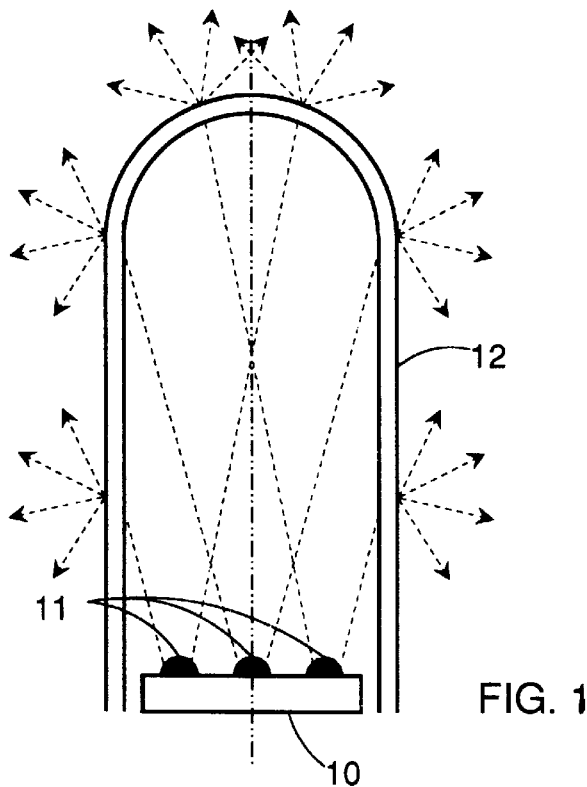
FIG. 1 shows a schematic cross-section of an optical transmitter module in accordance with the present invention.

In connection with FIG. 1, the basic concept of a transmitter module in accordance with the present invention is described. As illustrated in this Figure, such an optical transmitter module comprises an array of light emitting diodes 11, which are arranged in a regular and symmetrical manner. To fix the diodes 11 in the right position, a mounting base 10 is employed. The array of light emitting diodes 11 is situated in a dome-shaped housing 12. In the present example this dome-shaped housing 12 is a long cylindrical tube with a domed end section. This housing 12 is at least partially transparent. In addition it comprises diffusor means to provide for an apparent source enlargement. Diffusor means can be realized in different ways. The housing 12 might for example consist of a plastic material comprising suspended particles of high refractive Index such that at least part of the housing serves as diffusor. In another embodiment, diffusion of the light beams emitted by the light emitting diodes 11 can be achieved by means of a housing 12 having a corrugated surface. A plexiglass housing which has been sandblasted with glass chips (size between 100–150 micron) provides a four-fold on-axis power reduction with half-power angle (LEDs DN305 Stanley have been used) increase from 7.5° to 10° (vertical incidence of light at the diffuser). Other diffusor means will be described in connection with the following embodiments. Depending on the roughness of the diffusor surface, or on the number and size of particles integrated into the diffusor housing, either a full diffusor or a partial diffusor can be achieved. The usage of such a full diffusor results in a Lambertian source.

Figure 2:
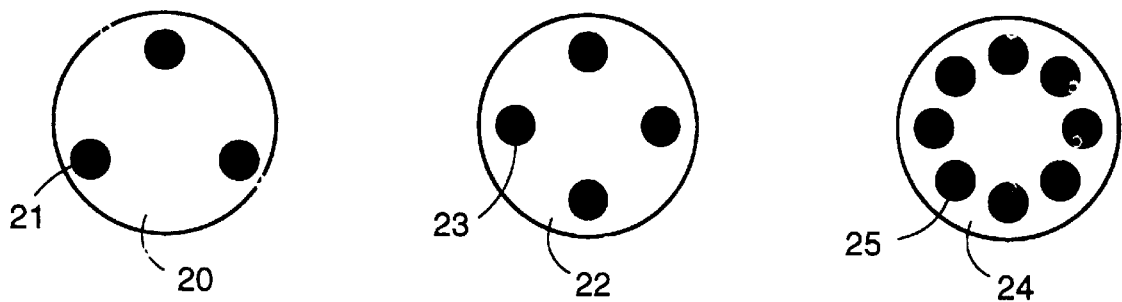
FIG. 2 shows three different regular and symmetrical configurations of light emitting diodes.

Depending on the symmetry of the configuration and elevation angle of the light emitting diodes, the radiation angle of the diodes, the shape of said housing, the diffusor means, and their location in said housing with respect to each other, different radiation patterns can be obtained. In FIG. 2, top views of three exemplary diode configurations are shown. The mounting base 20, on the left hand side of FIG. 2, carries only three light emitting diodes 21 being arranged in a triangular manner. The mounting base 22, carries four regularly arranged diodes 23, and the mounting base 24 carries eight light emitting diodes 25. These eight diodes 25 are arranged in a circular manner. It is obvious from these three examples, that any kind of symmetrical and regular arrangement of light emitting diodes in connection with an appropriate housing and diffusor is suited to obtain a high degree of eye safety and an optimum source radiation pattern.

Before further embodiments will be described, more details concerning the light emitting diodes are given. The light emitting diodes herein shown are commercially available diodes being encapsulated in a small, conventional plastic housing. Such diodes are available in plastic housings of different size, material, and with various radiation patterns and angles. Well suited are for example Stanley DN305 and DN304 light emitting diodes. It is obvious, that the present invention is not limited to the use of individual diodes, each being encapsulated in its own housing. Under certain circumstances, it might be advantageous to use an array of diodes, all of them being encapsulated or packaged in one common housing. It is further conceivable, to employ either separate light emitting diodes or an array of light emitting diodes grown on a common substrate, without housing. The dome-shaped housing in which these diodes will be located, then replaces the diode's own housing and serves to protect these diodes.

Figure 3:
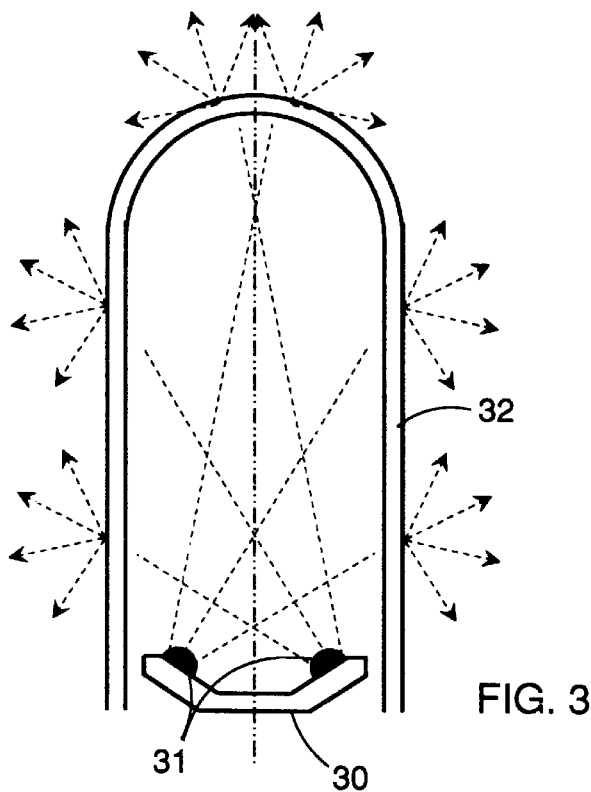
FIG. 3 shows a schematic cross-section of an optical transmitter module in accordance with the present invention.

In FIG. 3, another optical transmitter module, in accordance with the present invention, is shown. This module comprises a mounting base 30 on which light emitting diodes 31 are arranged in a regular and symmetrical manner. The mounting base 30 has inclined surfaces and the diodes 31 are fixed on it such that they face towards the center axis of the cylindrical housing 32. The diffusor is integrated into the housing e.g. by means of suspended particles.

Figure 4:
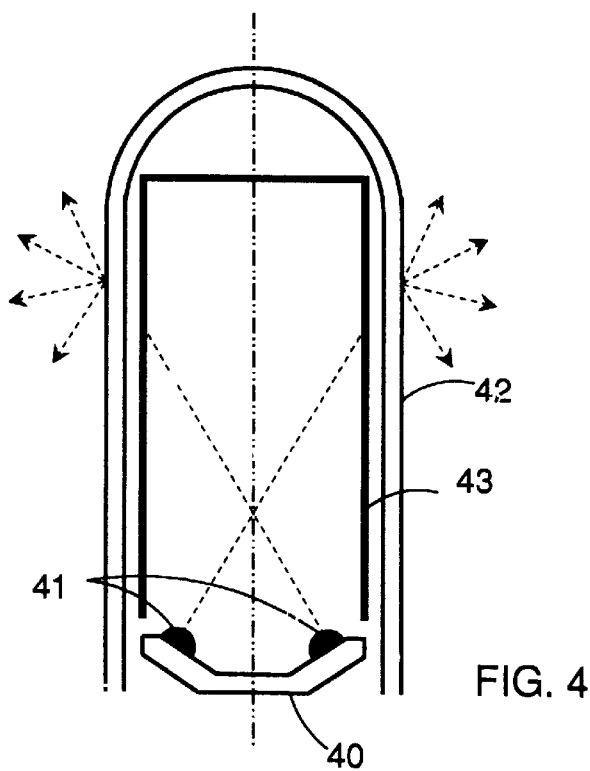
FIG. 4 shows a schematic cross-section of an optical transmitter module in accordance with the present invention.

In the next embodiment, illustrated in FIG. 4, a computer-generated phase hologram 43 is employed to obtain suitable beam shaping. This hologram is located in the cylindrical housing 42 which covers the array of light emitting diodes 41 located on a mounting base 40.

Figure 5:
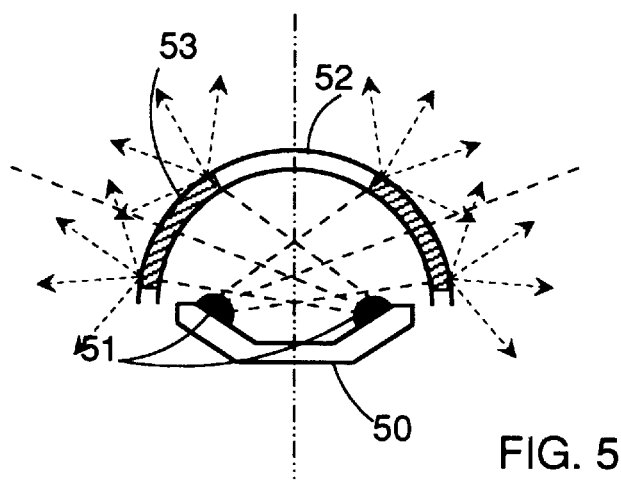
FIG. 5 shows a schematic cross-section of an optical transmitter module in accordance with the present invention.

In FIG. 5, an optical transmitter module with dome-shaped housing 52 is shown. This module further comprises a mounting base 50 carrying an array of light emitting diodes 51. Part of the housing 52 comprises a full diffusor surface 53 to obtain diffusion of the light beams emitted by the diodes 51. Similar results can be obtained by means of a checkerboard diffusor pattern applied to the housing. If the diffusor surface is situated at the inside of the housing 52, contamination of the diffusor by finger grease or dust can be prevented. Different degrees of diffusion may be obtained by varying the roughness of the diffusor surface, by changing the checkerboard pattern, or by applying the diffusor surface on the inside and the outside of the housing. The required surface roughness can be obtained by sandblasting or etching the mould for pressing the plastic housing. In case of a plastic housing comprising suspended particles, the degree of diffusion can be modified by imbedding particles of different size and/or shape.

Figure 6A:
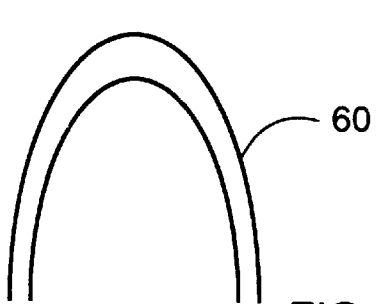
FIG. 6A is a cross-sectional view of a dome-shaped housing.
Figure 6B:
FIG. 6B is a cross-sectional view of a dome-shaped housing.

Other dome-shaped housings 60 and 61 are schematically illustrated in FIGS. 6A and 6B.

Figure 7:
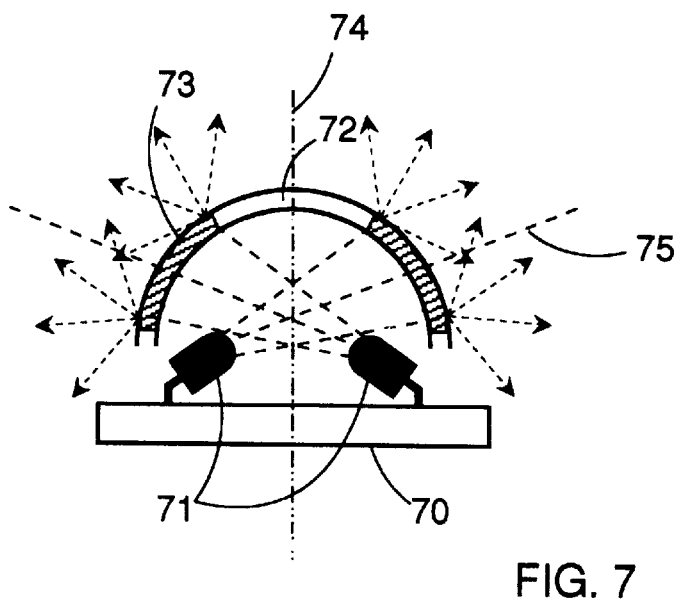
FIG. 7 shows a schematic cross-section of an optical transmitter module in accordance with the present invention.

The optical transmitter module given in FIG. 7, comprises a flat mounting base 70 on which conventional light emitting diodes 71 are arranged. The pins of these diodes are bent, such that the diodes emit light towards the center axis 74 of the dome-shaped housing 72. This arrangement is advantageous in applications where the space is limited and the whole transmitter module ought to be small. It has been determined, that the inclination angle of the diodes, i.e. the angle between a plane being perpendicular to the center axis 74 of the dome-shaped housing 72 and the center axis 75 of the diode's radiation cone, should preferably lie between 5° and 80°, aid in particular between 20° and 40°. The optimum angle between the center axis of a LED and the mounting base is about 25°, as far as the use in the herein described and claimed modules is concerned. The angle of 25° results in a maximum diffuse range in offices with low ceilings (2.5–3.5 m).

Figure 8:
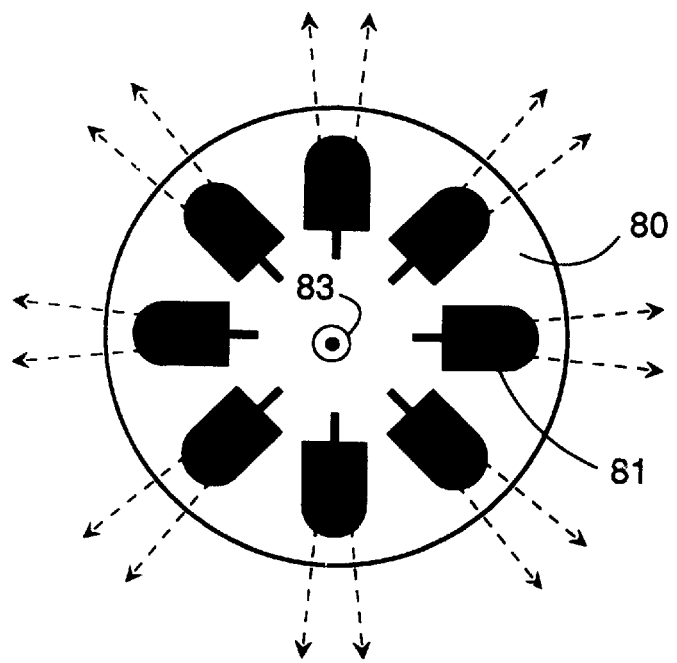
FIG. 8 is a schematic top-view of an optical transmitter module in accordance with the present invention

Another configuration is illustrated in FIG. 8. In this embodiment, eight light emitting diodes 81, each of them having its own housing, are arranged in a circular and regular manner on a mounting base 80 such that light is emitted radially with respect to the module's center axis 83. Narrow beam light emitting diodes with an elevation angle of approximately 25° are well suited for use in this embodiment.

Figure 9:
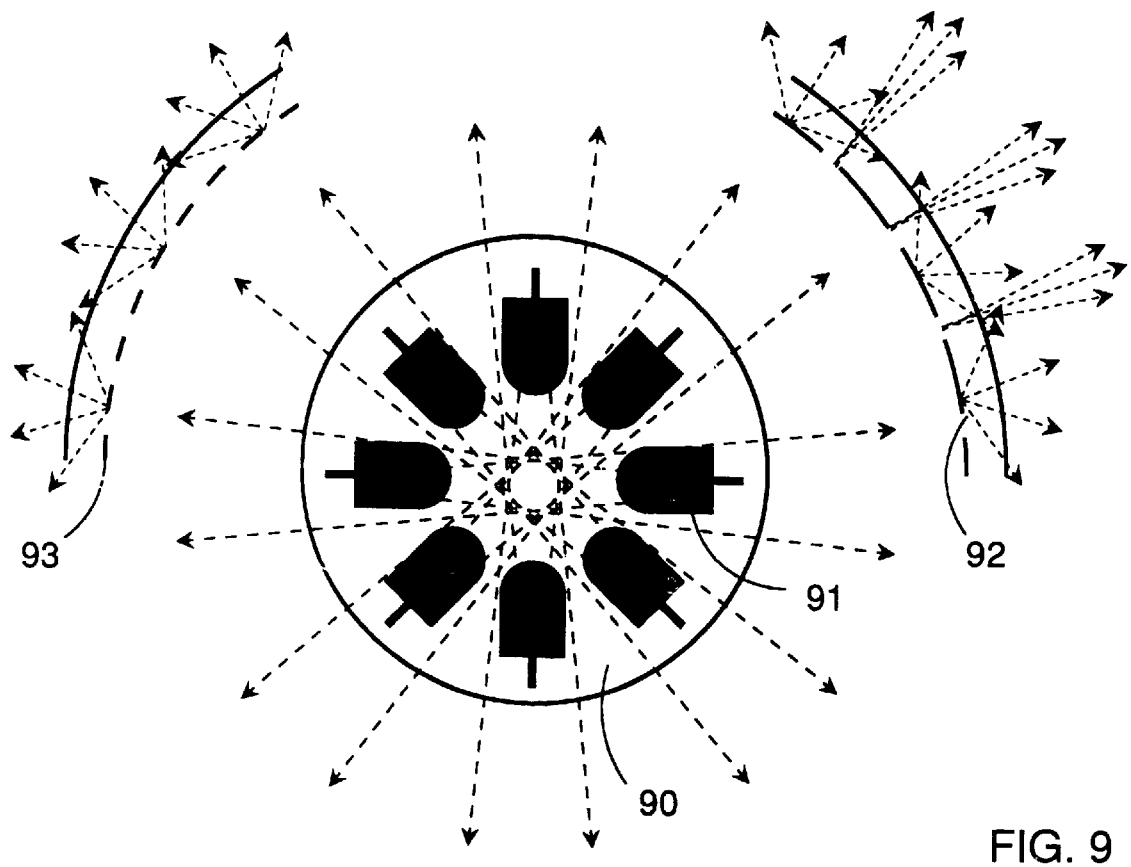
FIG. 9 is a schematic top-view of an optical transmitter module in accordance with the present invention.

A similar, star-like configuration with eight diodes is shown in FIG. 9. In this embodiment, the diodes 91 carried by a mounting base 90 face towards the center axis of the housing. On the left hand side of this Figure, a housing with a full diffusor surface 93 is shown. Full diffusor means that the corrugated surface covers the whole beam cross section. The diffusor can be strong (producing a Lambertian source) or weak (producing additional scattering of the beam to improve eye-safety). This full diffusor surface is realized at the inner surface of the dome-shaped housing. The respective radiation pattern obtained by diffusor means 93 is illustrated next to it. On the right hand side, a schematic sketch of a dome-shaped housing is shown which comprises a checkerboard diffusor pattern 92 serving as diffusor. The respective radiation pattern is indicated next to this sketch. As schematically illustrated, part of the light passes the diffusor almost unobstructed, and the remaining light beams are scattered. Such a checkerboard pattern could for example be realized by drilling holes into the housing, or by using a suited mask when sandblasting it.

Figure 10:
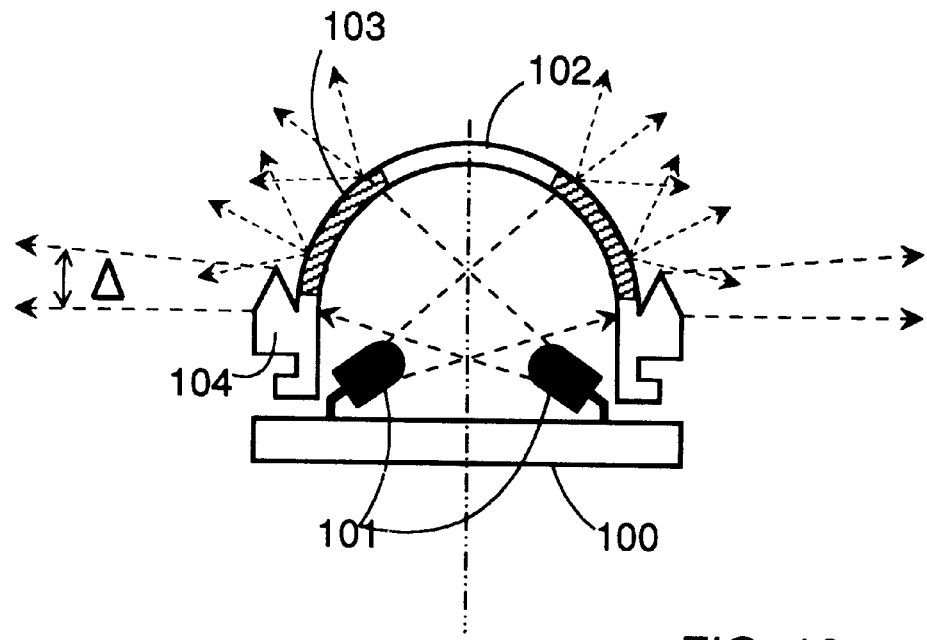
FIG. 10 shows a schematic cross-section of an optical transmitter module in accordance with the present invention.

An optical transmitter module with dome-shaped housing 102, diffusor means 103, and an additional ring-shaped prism section 104 being integrated in the housing 102, is illustrated in FIG. 10. As illustrated by means of dashed lines, this prism ring 104 deflects part of the beam power, denoted with Δ, (downward) in a horizontal direction. The remaining portion is emitted through the diffusor 103, directly. The prism ring 104 improves line-of-sight path communication.

Figure 11:
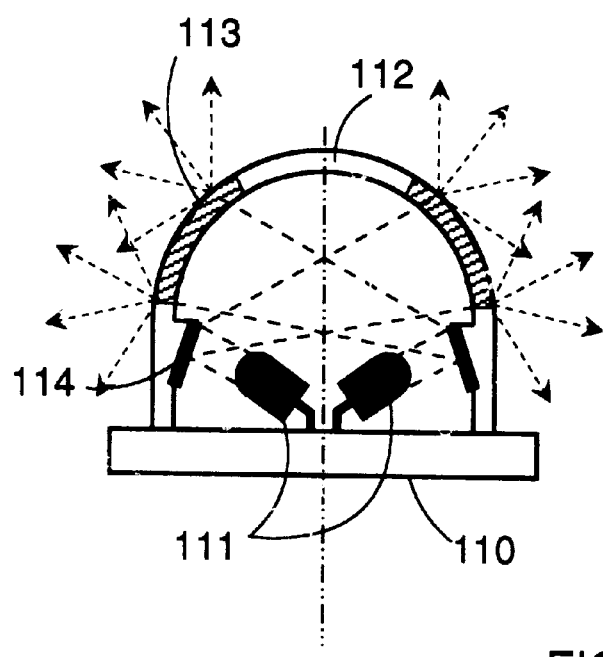
FIG. 11 shows a schematic cross-section of an optical transmitter module in accordance with the present invention.

A further embodiment of the present invention is shown in FIG. 11. The module illustrated in this Figure, comprises a mounting base 110 on which an array of light emitting diodes 111 is situated. These diodes 111 are inclined with respect the mounting base 110 and emit light radially. The dome-shaped housing 112 comprises a reflector ring 114 at the inner surface and diffusor means 113. This reflector ring reflects at least part of the beams emitted by said diodes 111 upward, before the beams pass the diffusor 113.

Figure 12:
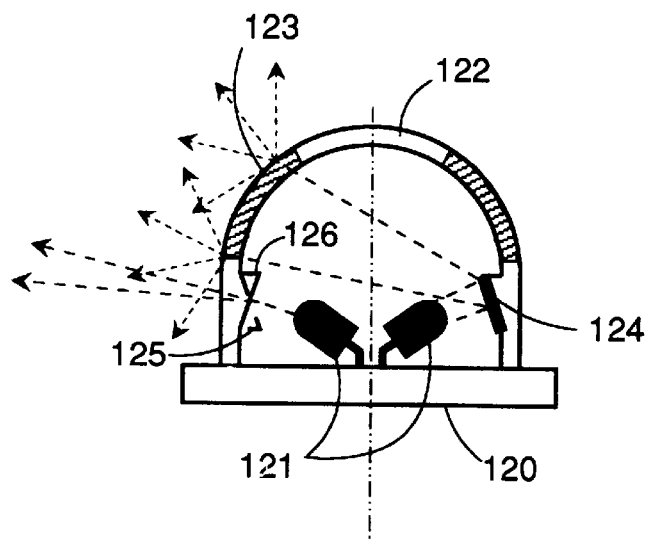
FIG. 12 shows a schematic cross-section of an optical transmitter module with switchable radiation pattern in accordance with the present invention.
Figure 13A:
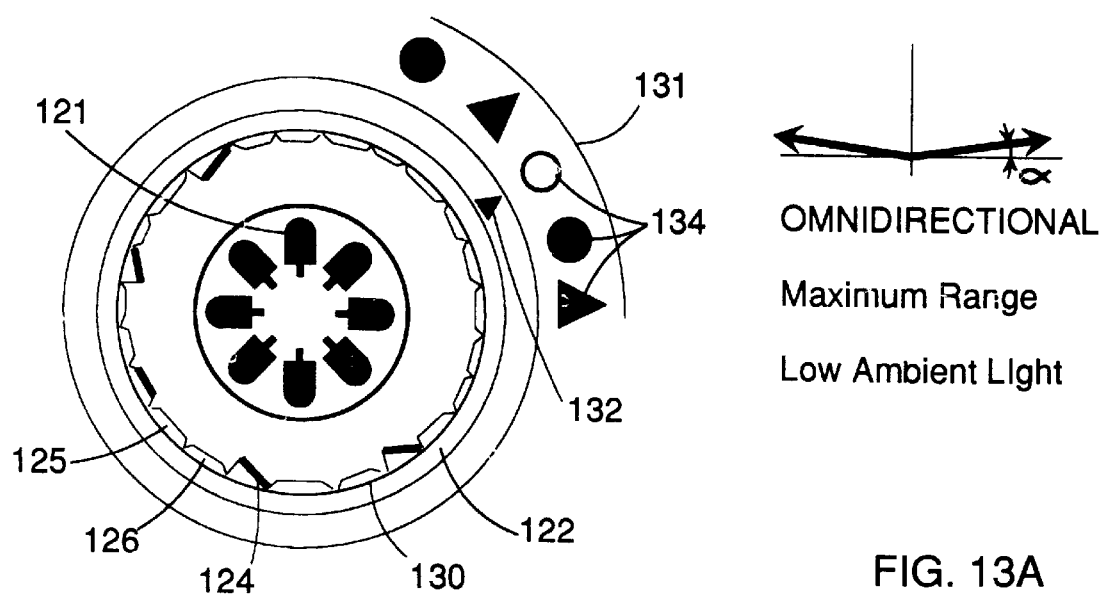
FIG. 13A is a schematic top-view of the optical transmitter module with switchable radiation pattern illustrated in FIG. 12.
Figure 13B:
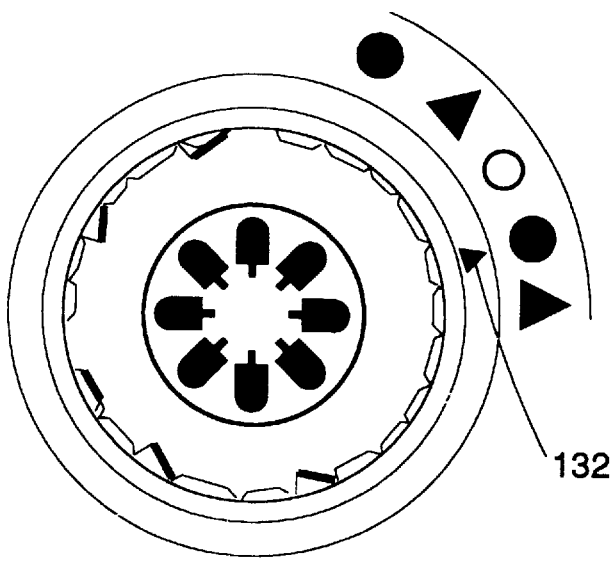
FIG. 13B is a schematic top-view of the optical transmitter module with switchable radiation pattern illustrated in FIG. 12.
Figure 13B:
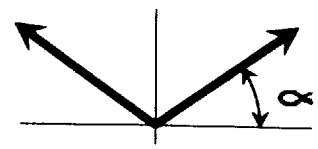
Figure 13C:
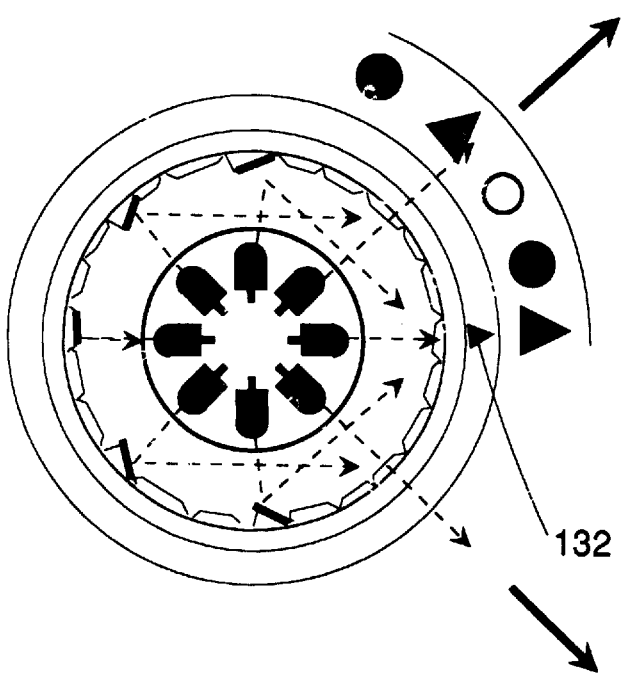
FIG. 13C is a schematic top-view of the optical transmitter module with switchable radiation pattern illustrated in FIG. 12.

A cross-sectional view of another embodiment is shown in FIG. 12. An optical module is shown in this Figure, which allows to switch the beam pattern, as illustrated in FIGS. 13A–13C. The purpose of beam switching is either to have a radiation pattern (e.g. 25°) giving maximum omnidirectional range (see FIGS. 13A and B), or maximum range in a certain direction (see FIG. 13C). This switchable module comprises a mounting base 120 on which an array of diodes 121 is fixed. The diodes are located in a dome-shaped housing 122 which shows diffusor means 123, reflector means 124, upward deflecting prisms 125, and downward deflecting prisms 126, both with roughened surfaces. The modes of operation of this switchable module are described in connection with FIGS. 13A–13C. In these Figures, top views of the module are given. As shown in FIG. 13A, the housing 122 comprises a series of reflector means 124 and deflector prisms 125, 126 along its inner surface 130. For sake of simplicity, the reflector means 124 are indicated by a bold line. Switching of the beam pattern can be achieved in that the housing with reflectors 124 and deflector prisms 125, 126 can be rotated with respect to and around the center axis of the array of light emitting diodes 121. The deflector angles (horizontal plane) determine the desired reflected beam direction. The position of the arrow marker 132 (on the rotating housing 122) with respect to the (fixed) symbols 134 indicates the selected beam pattern. If the marker 132 points on the symbol "empty circle", the module emits light with an elevation angle α of approximately 25° in all directions, i.e. in this mode of operation, the module serves as omnidirectional antenna with maximum transmission range and is suited for low ambient light. This position repeats every 45°.

Marker 132 on the symbol "full circle", see FIG. 13B, indicates a beam elevation angle a of approximately 30°–40° for increased omnidirectional power density in the vicinity of the module in high ambient light environments. This position repeats every 45°. In the example shown in FIG. 13C, the pointer 132 points on the symbol "arrow". This indicates the selected beam direction for increased directed range. The beams within the housing are indicated by means of dashed arrows. Eight different radiation directions may be chosen in increments of 45°.

Figure 14:
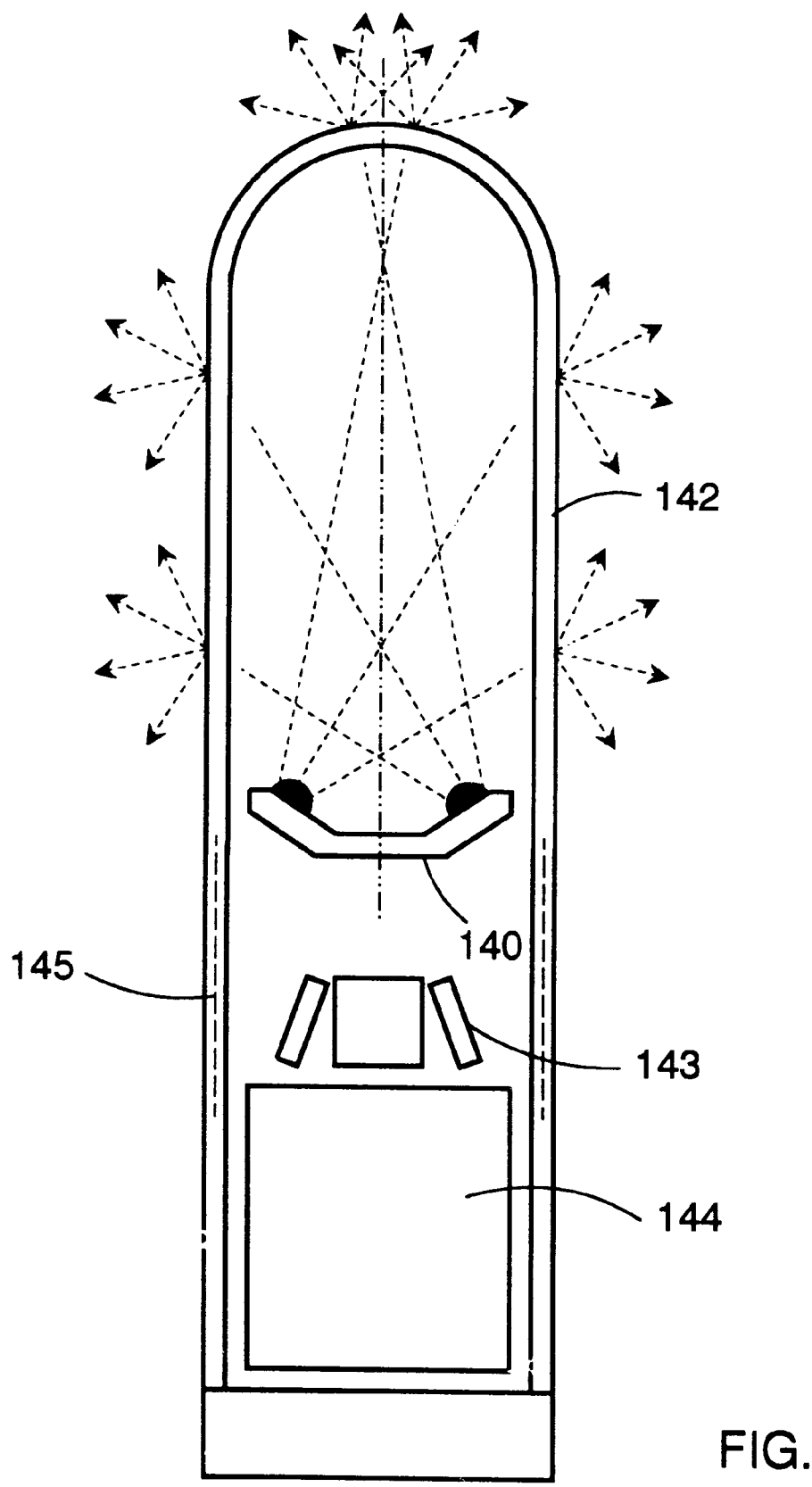
FIG. 14 shows a schematic cross-section of an optical transceiver module in accordance with the present invention.
Figure 15A:
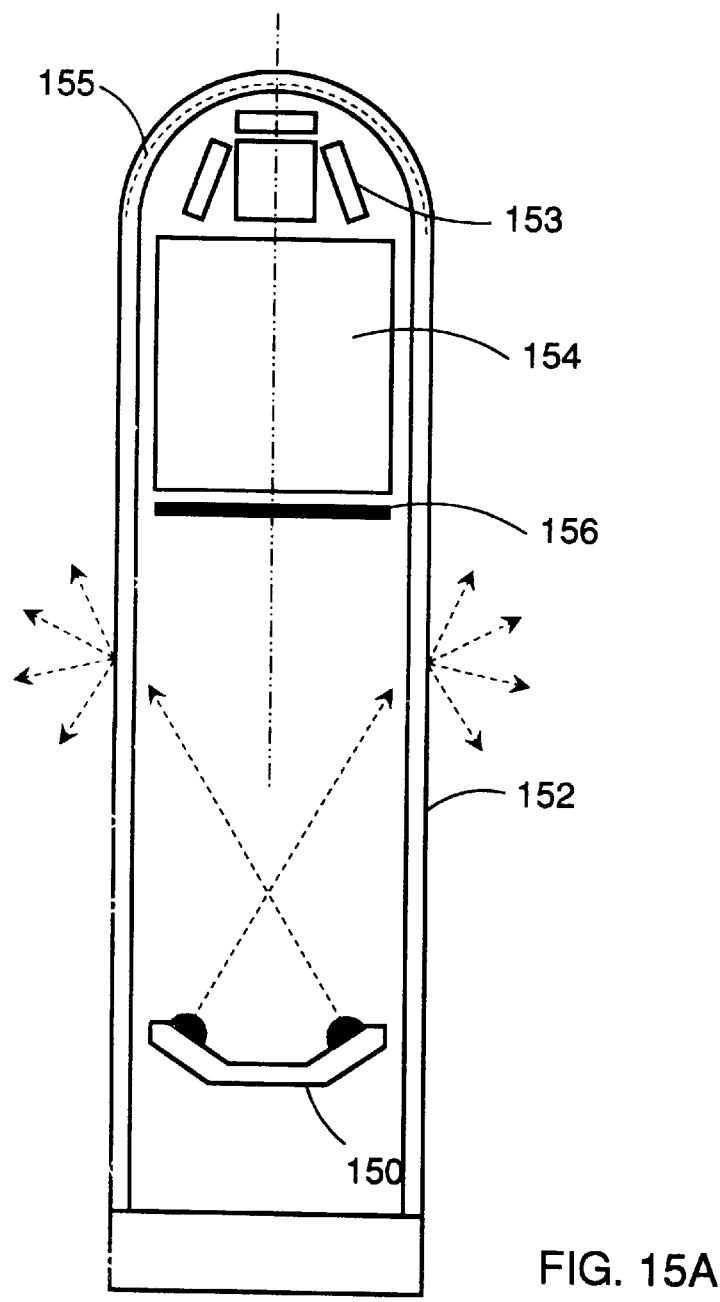
FIG. 15A shows a schematic cross-section of an optical transceiver module in accordance with the present invention.
Figure 15B:
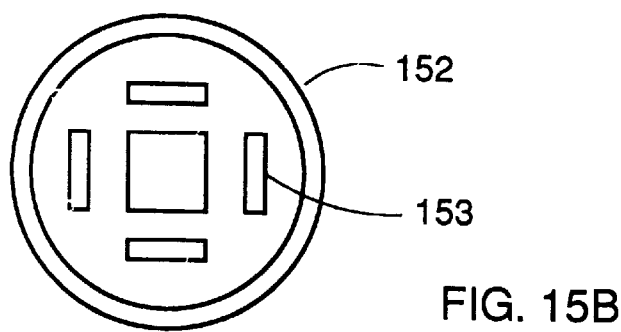
FIG. 15B is a schematic top-view of the receiver part of the optical transceiver module illustrated in FIG. 15A.
Figure 16:
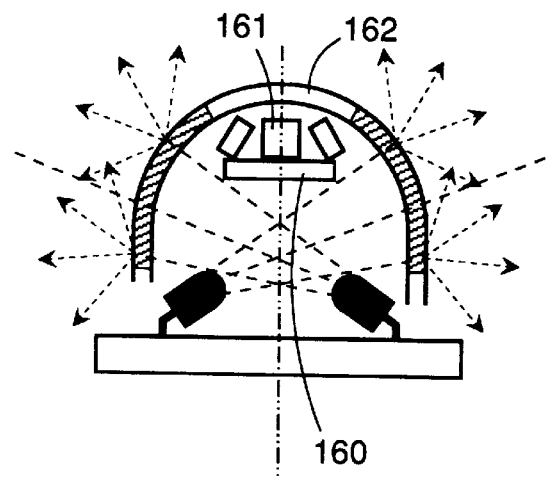
FIG. 16 shows a schematic cross-section of an optical transceiver module in accordance with the present invention.

In FIGS. 14 to 16, optical transceiver modules, in accordance with the present invention, are shown. The embodiment shown in FIG. 14 is based on the module illustrated in FIG. 3. This module in addition to the transmitter part comprises a receiver. The receiver has four photodiodes 143 arranged below the mounting base 140. These photodiodes are tilted and face in different directions to receive light from all around the module. The orientation and configuration of these photodiodes depends on the field-of-view of each diode, as well as on the shape of the housing and the position within the housing. The photodiodes are protected by a thin wire mesh 145 which serves as Faraday cage to reduce electro magnetic interference. In the present embodiment, this wire mesh 145 is integrated into the dome-shaped housing 142. In this module, a substrate 144 for electronic circuitry in SMD-Technology is situated underneath the photodiodes 143. This substrate 144 might carry preamplifiers, LED drivers, or complete analog chips, if the space permits.

In the next embodiment which is shown in FIG. 15, the receiver part is situated above the transmitter part, i.e. above the light emitting diodes carried by a mounting base 150. The receiver comprises an array of five photodiodes 153, all of them being arranged such that light is received from all directions. These photodiodes are protected by a wire mesh 155 being integrated into the domed endsection of the housing 152. A substrate 154 with electronic circuitry is situated underneath these photodiodes 153. The receiver part is separated from the transmitter by means of a reflector 156. In FIG. 15B, a schematic top view of the receiver part is shown.

Another optical transceiver module is illustrated in FIG. 16. This module is based on the transmitter module being shown in FIG. 7 and differs in that a receiver is integrated in the same housing 162. This receiver comprises an array of photodiodes 161 being mounted on a base plate 160. The receiver is located such that the beams emitted by the light emitting diodes pass the housing and diffusor almost unobstructed. Narrow-beam light emitting diodes with an elevation angle of approximately 25° are well suited for use in this embodiment. Modules with a star-shaped array of 3–6 photodiodes at 30°–45° elevation angle showed good results.

Figure 17A:
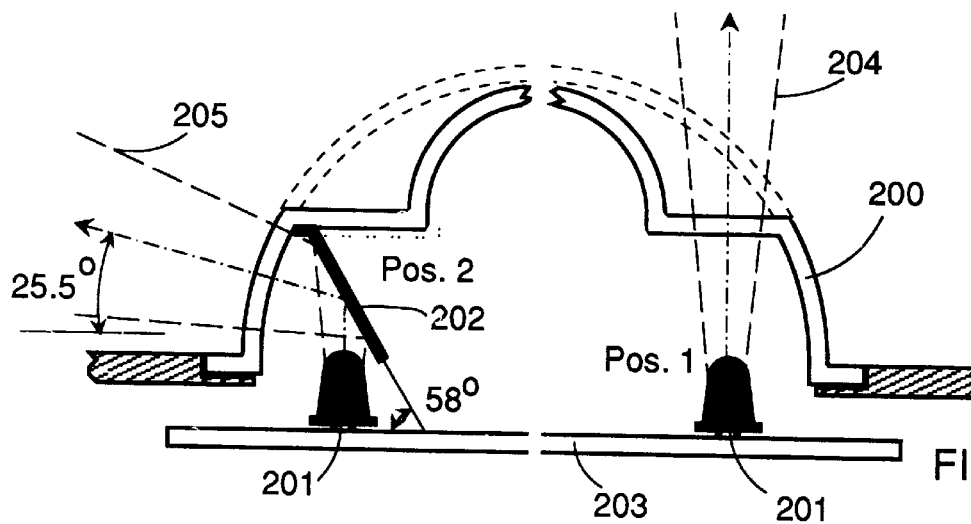
FIG. 17A shows a schematic cross-section of an optical transmitter module with switchable radiation pattern in accordance with the present invention.
Figure 17B:
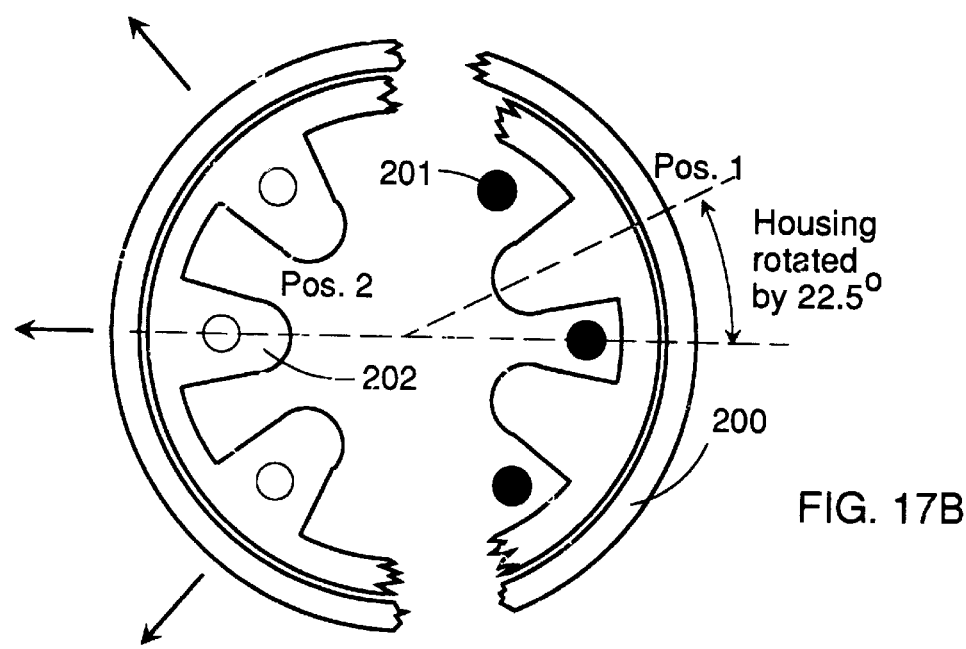
FIG. 17B is a schematic top-view of the housing and reflector ring of the optical transceiver module illustrated in FIG. 17A.

Another embodiment of the present invention is illustrated in FIGS. 17A and 17B. Shown is a cross section and top view of a module with switchable beam pattern. The array of light emitting diodes 201 is situated on a mounting base 203. The light emitting diodes 201 are located in a symmetrical manner underneath a dome-shaped diffusor housing 200. If this housing is in Position 1 (Pos. 1) with respect to the light emitting diodes 201 (see right hand side of FIGS. 17A and 17B), the light is emitted vertically through the housing 200. Depending on whether this part of the housing is realized as diffusor, the beam pattern is focused or spread. The housing 200 comprises a reflector ring 202. If the housing 200 or the reflector ring 202 is rotated with respect to the diodes 201 (Pos. 2 on the left hand side of FIGS. 17A and 17B) the light beams emitted by the diodes are reflected towards the side facet of the housing 200. This side facet is usually comprises diffuser means to achieve widening of the beam. It is shown in FIG. 17B that the reflector ring 202 might be carried out as a ring with several 'tongues'. The reflector ring 202 can be made using a thin metal which is embossed or punched. In the example given in FIGS. 17A and 17B, a rotation of 22.5° allows to switch from position 1 to position 2.

Another concept of an optical transmitter module with switchable beam pattern is illustrated in FIGS. 18A and 18B. This module comprises an array of light emitting diodes 211 which are situated in via holes or depressions of a mounting base 213. The diodes 211 are covered by a dome-shaped diffusor housing 210. A reflector ring 212 is integrated into the housing 210. This ring 212 comprises tongues or cantilevers bent such that the light beam emitted by the diodes is reflected towards the side walls of the diffusor housing 210 (see position 2 on the left hand side of FIGS. 18A and 18B). If the housing with reflector ring is rotated such that the diodes 211 are not situated underneath the reflecting tongues or cantilevers of the ring 212, the light beams are emitted vertically with respect to the mounting base 213 (see position 1 on the right hand side of FIGS. 18A and 18B).

In FIGS. 19A and 19B, a fixture for mounting a module 220 with switchable beam pattern is shown. In FIG. 19A, the housing and reflector ring is in position 2, i.e. the light beam is emitted omnidirectional, and the transmitter radiates as indicated by the arrows. In FIG. 19B, the fixture 211 with module 220 is opened up, and the module is in position 1, i.e. it radiates light perpendicular to the mounting base of the diodes. This fixture 221 allows direct line of sight communication if the module is in position 1 and faces a remote receiver.

Figure 20:
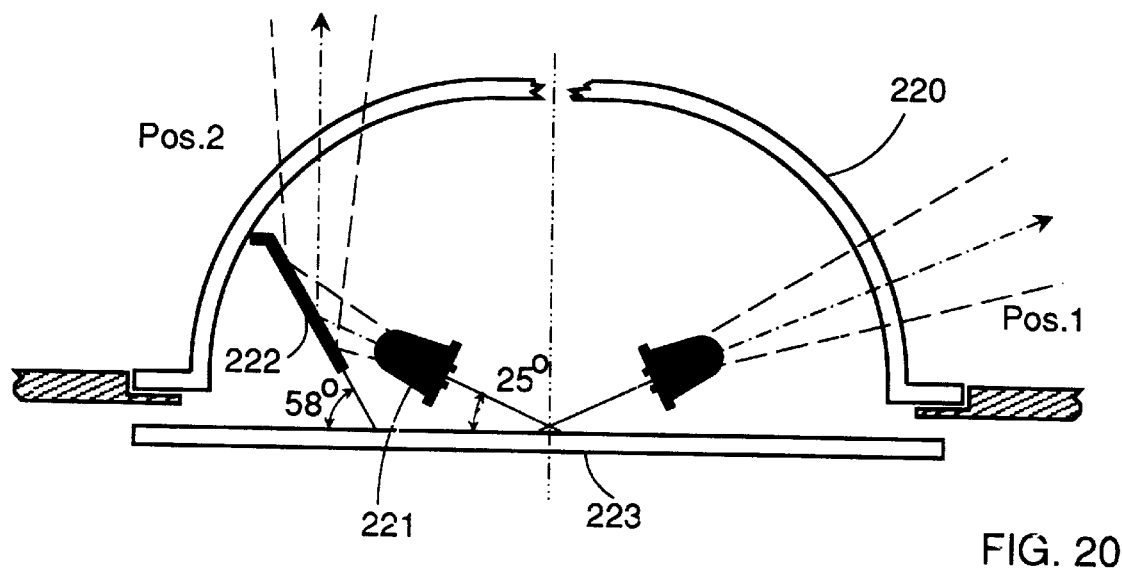
FIG. 20 shows a schematic cross-section of an optical transmitter module with switchable radiation pattern in accordance with the present invention.

Another configuration of a switchable transmitter module is shown in FIG. 20. In this embodiment, the center axis of the diodes 221 are tilted approximately 25° with respect to the mounting base 223. If the dome-shaped housing 220 is in position 1 (see right hand side if FIG. 20), the light beans pass the housing as indicated. In position 2, a reflector 222 is placed in front of the light emitting diodes 221, and the light beam is reflected upwards (see FIG. 20 on the left hand side). In the present example, the reflector 222 is a thin metal plate having an angle of inclination of about 58°. The reflectors can be carried by a metal ring which is integrated into, or fixed in the housing 220.

The reflector ring shown in FIGS. 17, 18, and 20, might be replaced by a prism ring. This is a ring which could be made of plastic and which carries a series of prism shaped and arranged such that different beam radiation patterns are obtained depending on the position of this prism ring with respect to the light emitting diodes. This prism ring might be an integral part of the dome-shaped housing. Different approaches are conceivable where either the housing carrying the prism or reflector ring is rotated with respect to the position of the diodes, or where the ring as such is rotated with respect to the housing and diodes, or where the diodes themselves are rotated.

The reflectors in FIGS. 11 and 12 might be replaced by a metal ring carrying 'tongues' or cantilevers, as described in connection with FIGS. 17, 18 and 20. The only difference with respect to a switchable module would be that this metal ring would then be fixed (not rotatable).

Figure 21A:
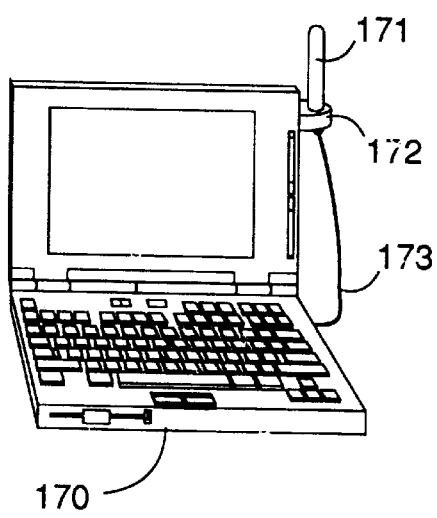
FIG. 21A shows a notebook computer with an optical transmitter or transceiver module being attached to it.
Figure 21B:
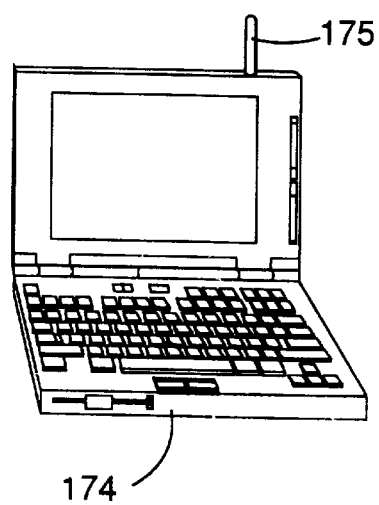
FIG. 21B shows a notebook computer with an integrated optical transmitter or transceiver module.

Two different integration or attachment schemes of the present transmitter and transceiver modules for notebook computers are illustrated in FIGS. 21A and 21B. The optical transmitter or transceiver modules herein described should be free of near-field obstructions through housing or display panel of the computer to which it is attached or into which it is integrated. In FIG. 21A, a notebook computer 170 with removable optical transmitter/transceiver module 171 is shown. This module 171 is attached with a magnet or Velcro clip 172 to said computer 170. A cable 173 interconnects the module 171 with an interface card plugged into one of the computer slots. In FIG. 21B, a computer 174 with integrated module 175 is shown. This module is integrated into the display and any electrical interconnections and the respective interface circuitry are placed inside the computer. This module 175 can be retractable.

Figure 22:
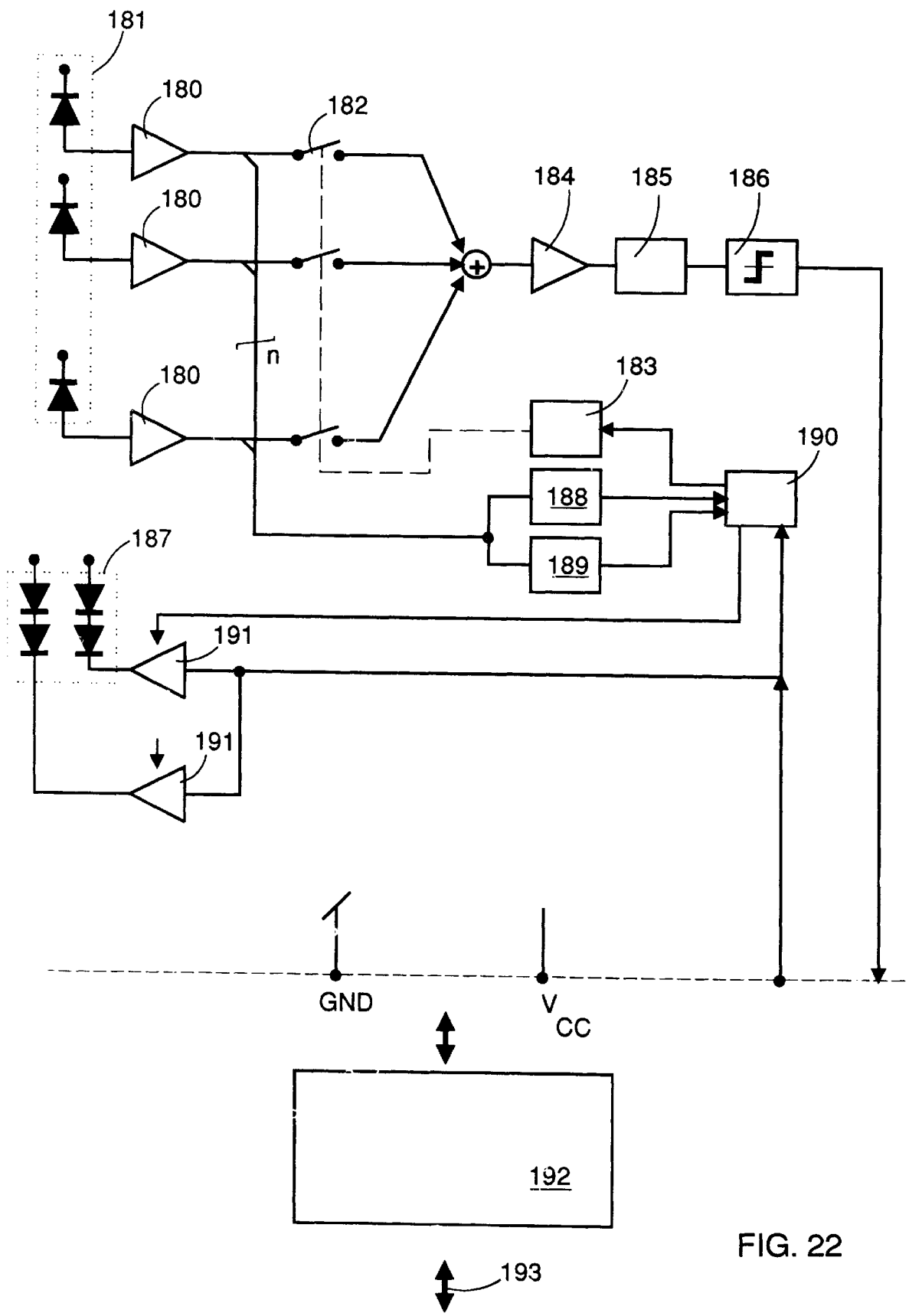
FIG. 22 is a schematic block diagram of the analog frontend of a transceiver in accordance with the present invention.

A block diagram of a specially designed analog frontend circuitry is lustrated in FIG. 22. This circuitry comprises preamplifiers 180 coupled each photodiode of the photodiode array 181 as receiver. The switches 182 together with a switch control unit 183 facilitate a selection of the signals received by the respective photodiodes. All, or a subset of the received signals is forwarded to a postamplifier 184, and then fed through a filter 185 to a comparator 186. In the present block diagram, means for proximity detection are included. For proximity detection the echo signal received at the photodiodes 181 and emitted by the array of light emitting diodes 187 is watched. If the echo signal exceeds a predetermined level, the light emitting diodes 187 are automatically switched off. This active safety interlock is achieved by means of a peak signal detector 188 which is coupled via a bus n parallel lines to the output of the preamplifiers 180. A control circuit 190 analyzes the received signal to detect strong echo signals. It then immediately switches the drivers 191 such that no more light is emitted. The control circuitry 190, together with a DC photo current detector 189 and the switch control unit 183 allows an automated selection and/or combination of signals. This selection takes into account the actual signal strengths and/or the DC currents (measure of shot noise received from directed ambient light sources like sunlight, desk lamps) of the photodiodes 181.

The whole analog frontend is connected via an interface unit 192 (PCMCIA) to the microprocessor bus 193.

The optical transmitter modules and transceiver modules presented herein are eye-safe optical systems and have several additional advantages. They are compact and suited for integration into computers and other devices. A module in accordance with the present invention can be easily attached to any notebook computer. The modules are characterized by their optimum, nearly uniform circular radiation characteristic, which in some embodiments can be switched. The modules allow to distribute and receive the power-limited optical signal in an efficient way to gain maximum transmission distance. Intense directed ambient light can be suppressed by means of an analog frontend as illustrated in FIG. 18. The present modules are distinguished from conventional transmitters in that less total shot noise occurs, thus improving the signal/noise ratio and transmission range. In addition, there is no need for aligning the transceiver modules. One special embodiment of the present invention facilitates two transmission modes namely diffuse and/or line-of-sight communication.

The present transmitter and transceiver modules comply with IEC 825-1 regulations. This can be achieved with a large enough extended apparent source, and/or with an active safety interlock if the head of a person comes too close to the emitter. As described above, this interlock mechanism might be based on sensing the strong reflected echo signal with the photodiodes of the emitting transceiver module caused by a nearby object (proximity detection).

The present invention provides an automatic mechanism to block intense directional ambient light (from desk lamps, windows, direct sunlight) in order to optimize the transmission range for a given data rate. This feature can be implemented by selectivity-combining of individual photodiodes pointing in different spatial directions (sectorization), thus selecting the maximum possible signal/noise ratio.

What is claimed is:

1. An optical data module comprising:
    an array of infra-red light emitting diodes arranged in a regular manner and being individually and/or commonly addressable;
    a dome-shaped housing forming a cavity, said dome-shaped housing having a diffusor; and
    a phase hologram located inside the housing,
    wherein said array is situated within said cavity such that infra-red light is emitted from said array inside said cavity through said phase hologram acting as a beam shaper and through said diffusor providing for an apparent source enlargement.

2. The module of claim 1, wherein the light emitting diodes of said array are located on a mounting base such that the main radiation axis of the diodes is approximately parallel to the center axis of said dome-shaped housing.

3. The module of claim 1, wherein the light emitting diodes of said array are located on a mounting base such that the main radiation axis of the diodes is tilted with respect to the center axis of said dome-shaped housing.

4. The module of claim 3, wherein the light emitting diodes are arranged such that they face towards said center axis.

5. The module of claim 3, wherein the light emitting diodes are arranged such that they face radially outwards with respect to said center axis.

6. An optical data module comprising:

an array of infra-red light emitting diodes arranged in a regular manner and being individually and/or commonly addressable; and a dome-shaped housing forming a cavity said dome-shaped housing having a diffusor formed by suspending particles of high refractive index within said dome-shaped housing, wherein said array is situated within said cavity such that infra-red light is emitted from said array inside said cavity through said diffusor providing for an apparent source enlargement.

7. An optical data module comprising:

an array of infra-red light emitting diodes arranged in a regular manner and being individually and/or commonly addressable; and a dome-shaped housing forming a cavity, said dome-shaped housing having a diffusor formed by one or more corrugated surfaces situated at the inner and/or outer surface of said dome-shaped housing.

8. The module of claim 7, wherein said corrugated surface has a degree of roughness which matches the wavelength emitted by the light emitting diodes of the module.

9. An optical data module comprising:

an array of infra-red light emitting diodes arranged in a regular manner and being individually and/or commonly addressable; and a dome-shaped housing forming a cavity, said dome-shaped housing having a diffusor formed by one or more checkerboard pattern at the inner and/or outer surface of said dome-shaped housing.

10. An optical data module comprising:

an array of infra-red light emitting diodes arranged in a regular manner and being individually and/or commonly addressable;

a dome-shaped housing forming a cavity, said dome-shaped housing having a diffusor; and a prism ring cooperating with said dome-shaped housing, wherein said array is situated within said cavity such that part of the infra-red light emitted from said array inside said cavity passes through said diffusor providing for an apparent source enlargement while part of the light (Δ) emitted by said array of light emitting diodes passes through said prism ring deflecting the light downwards such that direct line-of-sight communication is improved.

11. An optical data module comprising:

an array of infra-red light emitting diodes arranged in a regular manner and being individually and/or commonly addressable;

a dome-shaped housing forming a cavity, said dome-shaped housing having a diffusor; and a series of reflectors, or a series of prisms located in a circular manner in said dome-shaped housing, wherein said array is situated within said cavity such that infra-red light is directly emitted, reflected, or deflected from said array inside said cavity through a first portion of said housing operating as a diffusor, providing a corresponding first radiation pattern, or through a second portion of said housing, providing a corresponding second radiation pattern, such that, depending on the position of said array of light emitting diodes with respect to said reflectors or prisms, the radiation pattern of said module can be switched.

12. The module of claim 11, wherein said dome-shaped housing is stepwise rotatable with respect to said array of light emitting diodes.

13. The module of any one of the claims 1, 6, 7, 9, 10, 11, and 12, wherein said array of infra-red light emitting diodes are further arranged in a symmetrical manner.

14. The module of claim 11, wherein said second portion of said housing operates as a diffusor providing a corresponding modified second radiation pattern.

15. An optical data module comprising:

an array of infra-red light emitting diodes arranged in a regular manner and being individually and/or commonly addressable;

a dome-shaped housing forming a cavity, said dome-shaped housing having a diffusor; and a series of reflectors, upward facing deflector prisms, and downward facing deflector prisms located in a circular manner at the inner surface of the housing, wherein said array is situated within said cavity such that infra-red light is directly emitted or is reflected from said array inside said cavity through said diffusor, providing for a an apparent source enlargement, or through said upward or downward facing deflector prisms, providing for a corresponding upward or downward directional radiation pattern, such that, depending on the position of said array of light emitting diodes with respect to said reflectors and deflector prisms, the radiation pattern of said module can be switched.

16. The module of claim 15, wherein said dome-shaped housing is stepwise rotatable with respect to said array of light emitting diodes.

17. The module of any one of the claims 1, 6, 7, 9, 10, 15, 11, 16 and 12, further comprising a receiver with an array of photodiodes being tilted with respect to said center axis of the housing.

18. The module of claim 17, wherein said photodiodes are located below said array of light emitting diodes in the same housing.

19. The module of claim 17, wherein said photodiodes are located above said array of light emitting diodes in the same housing.

20. The module of claim 17, wherein said photodiodes are mounted on a mounting base which is fixed in said housing.

21. The module of claim 17, wherein said housing further comprises a substrate with electronic circuitry and/or a thin wire mesh.

22. The module of any one of the claims 1, 6, 7, 9, 10, 15, 11, 16 and 12, wherein said optical data module is coupled to a computer, having a bus, through a bus interface.

23. The module of claim 22, wherein said optical data module is attached to a display panel of the computer by a clip connected to said interface via a cable.

24. The module of claim 22, wherein said optical data module is integrated in a fixed or retractable manner into the display panel of the computer.

25. A Transceiver for wireless data communication and for use in connection with a optical transmitter module having a dome-shaped housing forming a cavity having a diffusor means, an array of infra-red light emitting diodes being arranged in a regular manner and being either individually or commonly addressable, said array situated within said cavity, wherein said infra-red light is emitted from said array inside said cavity through said diffusor means providing for an apparent source enlargement, said transceiver comprising:

a) an array of photodiodes,
b) amplifiers for amplification of the signals received by said array of photodiodes,
c) means for detecting the information carried in the signals received by said array of photodiodes,
d) driver means for driving the array of infra-red light emitting diodes of said optical transmitter module,
e) means for active selection and individual combination of the signals received by each of the photodiodes of said array of photodiodes,
f) means for proximity detection by determining the strength of an echo signal and switching off the array of infra-red light emitting diodes of said optical transmitter module if said echo signal exceeds a predefined limit.

26. A Transceiver for wireless data communication and for use in connection with a optical transmitter module having a dome-shaped housing forming a cavity having a diffusor means, an array of infra-red light emitting diodes being arranged in a regular manner and being either individually or commonly addressable, said array situated within said cavity, wherein said infra-red light is emitted from said array inside said cavity through said diffusor means providing for an apparent source enlargement, and with a receiver with an array of photodiodes being tilted with respect to said center axis of the housing, said transceiver comprising:

a) amplifiers for amplification of the signals received by the array of photodiodes of said module,
b) means for detecting the information carried in the signals received by the array of photodiodes of said module,
c) driver means for driving the array of infra-red light emitting diodes of said module,
d) means for active selection and individual combination of the signals received by each of the photodiodes of the array of photodiodes of said module,
e) means for proximity detection by determining the strength of an echo signal and switching off the array of infra-red light emitting diodes of said module if said echo signals exceeds a predefined limit.

27. A computer system comprising:

a computer having a bus;

an optical transmitter module having a dome-shaped housing forming a cavity having a diffusor means, an array of infra-red light emitting diodes being arranged in a regular manner and being either individually or commonly addressable, said array situated within said cavity, wherein said infra-red light is emitted from said array inside said cavity through said diffusor means providing for an apparent source enlargement, an interface means for coupling said optical transmitter module to the bus of said computer; and an optical transceiver having an array of photodiodes, amplifiers for amplification of the signals received by said array of photodiodes, means for detecting the information carried in the signals received by said array of photodiodes, driver means for driving the array of infra-red light emitting diodes of said optical transmitter module, means for active selection and individual combination of the signals received by each of the photodiodes of said array of photodiodes, means for proximity detection by determining the strength of an echo signal and switching off the array of infra-red light emitting diodes of said optical transmitter module if said echo signal exceeds a predefined limit, an interface means for coupling said optical transceiver module to the bus of said computer.

28. A computer system comprising:

a computer having a bus;

an optical transmitter module having a dome-shaped housing forming a cavity having a diffusor means, an array of infra-red light emitting diodes being arranged in a regular manner and being either individually or commonly addressable, said array situated within said cavity, wherein said infra-red light is emitted from said array inside said cavity through said diffusor means providing for an apparent source enlargement, and with a receiver with an array of photodiodes being tilted with respect to said center axis of the housing, and an interface means for coupling said optical transmitter module to the bus of said computer; and, an optical transceiver having amplifiers for amplification of the signals received by the array of photodiodes of said module, means for detecting the information carried in the signals received by the array of photodiodes of said module, driver means for driving the array of infra-red light emitting diodes of said module, means for active selection and individual combination of the signals received by each of the photodiodes of the array of photodiodes of said module, means for proximity detection by determining the strength of an echo signal and switching off the array of infra-red light emitting diodes of said module if said echo signals exceeds a predefined limit, and an interface means for coupling said optical transmitter module to the bus of said computer.

* * * * *